US008774485B2

(12) United States Patent
Blaskovics et al.

(10) Patent No.: US 8,774,485 B2
(45) Date of Patent: Jul. 8, 2014

(54) SYSTEMS AND METHODS FOR PERFORMING SEGMENTATION AND VISUALIZATION OF MULTIVARIATE MEDICAL IMAGES

(75) Inventors: Tamas Blaskovics, Budaors (HU); Laszlo Rusko, Szeged (HU); Marta Fidrich, Szeged (HU)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 13/558,784

(22) Filed: Jul. 26, 2012

(65) Prior Publication Data
US 2014/0029831 A1 Jan. 30, 2014

(51) Int. Cl.
*G06K 9/00* (2006.01)
*A61B 6/00* (2006.01)

(52) U.S. Cl.
USPC ............................... 382/132; 382/274; 378/4

(58) Field of Classification Search
CPC .................................... G06K 9/00; A61B 6/00
USPC ......... 382/100, 103, 106–107, 128–134, 162, 382/164, 168, 171, 173, 181, 232, 254, 274, 382/276, 284–291, 305, 312; 345/440; 378/4, 21
See application file for complete search history.

(56) References Cited

U.S. PATENT DOCUMENTS

| 7,298,877 | B1 * | 11/2007 | Collins et al. | 382/128 |
| 7,333,645 | B1 * | 2/2008 | Mitchell et al. | 382/128 |
| 7,430,321 | B2 * | 9/2008 | Okada et al. | 382/173 |
| 2003/0053668 | A1 | 3/2003 | Ditt et al. | |
| 2005/0244042 | A1 * | 11/2005 | Sirohey et al. | 382/131 |
| 2008/0025583 | A1 | 1/2008 | Jabri et al. | |
| 2008/0031507 | A1 | 2/2008 | Uppaluri et al. | |
| 2008/0123912 | A1 | 5/2008 | Lal et al. | |
| 2008/0317317 | A1 | 12/2008 | Shekhar et al. | |
| 2010/0054563 | A1 | 3/2010 | Mendonca et al. | |
| 2011/0158491 | A1 | 6/2011 | Markova et al. | |
| 2012/0038649 | A1 * | 2/2012 | Kanitsar et al. | 345/440 |

FOREIGN PATENT DOCUMENTS

WO 2008/065594 A1 6/2008
WO WO2009/045461 4/2009

OTHER PUBLICATIONS

M.A. Viergever, et al "Registration, segmentation, and visualization of multimodal brain images" Computerized Medical Imaging and Graphics 25 (2011 147-151.
Zhang, et al, "Segmentation of Brain MR Images Through a Hidden Markov Random Field Model and the Expectation-Maximization Algorithm", IEEE Transactions on Medical Imaging vol. 20, No. 1, Jan. 2001.
Saitoh, et al, "Automatic Segmentation of Liver Region through Blood Vessels on Multi-Phase CT", IEEE, 2002.

(Continued)

*Primary Examiner* — Seyed Azarian
(74) *Attorney, Agent, or Firm* — The Small Patent Law Group; Dean D. Small

(57) ABSTRACT

A method for generating an image includes obtaining a first image and a second image of an object of interest, generating a joint histogram using the first and second images, transforming the information in the histogram from histogram space to image space using a look-up table, and generating a color image using the information output from the look-up table. A system and non-transitory computer readable medium are also described herein.

20 Claims, 11 Drawing Sheets

(56) References Cited

OTHER PUBLICATIONS

Menotti, et al, "Multi-Histogram Equalization Methods for Contrast Enhancement and Brightness Preserving", IEEE, Transaction on Consumer Electronics, vol. 55, No. 3, Aug. 2007.

Tobias, et al, "Image Segmentation by Histogram Thresholding Using Fuzzy Sets", IEEE Transactions on Image Processing, vol. 11, No. 12, Dec. 2002.

Bouman, et al, "aMultiscale Random Field Model for Bayesian Image Segmentation", Dec. 2, 1996.

Pluim et al. "Mutual information based registration of medical images: a survey." [online] IEEE Transactions on Medical Imaging, Vol. 22, No. 8, Aug. 2003. http://www.cs.jhu.edu/~cis/cista/746/papers/mutual_info_survey.pdf.

Hong et al. "integrated registration and visualization of MR and PET brain images." Medical Imaging 2004: Visualization, Image-Guided Procedures, and Display. Proceedings of SPIE vol. 5367. (SPIE, Bellingham, WA, 2004) DOI: 10.1117/12.535143, especially pp. 617-619, 623.

T.M. Deserno. "Biomedical Image Processing, Biological and Medical Physics." Biomedical Engineering, DOI: 10.1007/978-3-642-15816-2 1. Springer-Verlang Berlin Heidelberg 2001. pg. 17, 26-28, 30-34.

Scully. 3D Segmentation in the Clinic; A Grand Challenge II at MICCAI 2008—MS Lesion Segmentation. Jul. 14, 2008.

International Search Report and Written Opinion—application PCT/US13/52286, 8 pages, (2013).

* cited by examiner

SYSTEMS AND METHODS FOR PERFORMING SEGMENTATION AND VISUALIZATION OF MULTIVARIATE MEDICAL IMAGES

BACKGROUND OF THE INVENTION

The subject matter described herein relates generally to imaging systems, and more particularly, to systems and methods for performing image segmentation and visualization of multivariate medical images.

Imaging systems are widely used to generate images of various anatomical features or objects of interest. For example, in an oncology examination, a patient may go through a series of examinations, using for example, a computed tomography (CT) system, a positron emission tomography (PET) system, an ultrasound system, an x-ray system, a magnetic resonance (MR) system, a single photon emission computed tomography (SPECT) system, and/or other imaging systems. The series of examinations is performed to continuously monitor the patient's response to treatment. The images acquired during the examination may be displayed or saved to enable a physician to perform a diagnosis of the patient. Thus, the patient may be scanned with one or more imaging systems selected to provide the most relevant images needed by the physician to perform the medical diagnosis.

In operation, the images may be sequentially processed to solve a clinical problem, such as for example, patient screening, diagnosing, monitoring, etc. For example, the MR system may be configured to acquire T1-weighted images and T2-weighted images to enable the physician to assess pathologic tissues such as inflammations and tumors. Moreover, CT images may be utilized to enable the physician to visualize the anatomy, i.e. vessels, bones, etc. Additionally, dual-energy CT (DECT) images may be utilized to visualize different materials, such as for example, iodine, water, or calcium.

However, typical segmentation algorithms are configured to be utilized with images acquired from a single imaging system. For example, a CT algorithm may be utilized to segment CT images. Moreover, a different algorithm may be utilized to segment PET images. As a result, the information provided to physician to determine a diagnosis of the patient is typically presented as separate images acquired by different imaging system. Thus, the physician is not presented with joint information which may provide additional information that is relevant to the diagnosis.

SUMMARY OF THE INVENTION

In one embodiment, a method for generating an image is provided. The method includes obtaining a first image and a second image of an object of interest, generating a joint histogram using the first and second images, transforming the information in the histogram from histogram space to image space using a look-up table, and generating a color image using the information output from the look-up table.

In another embodiment, an imaging system is provided. The imaging system includes an imaging scanner and a processor coupled to the imaging scanner. The processor is configured to obtain a first image and a second image of an object of interest, generate a joint histogram using the first and second images, transform the information in the histogram from histogram space to image space using a look-up table, and generate a color image using the information output from the look-up table.

In a further embodiment, a non-transitory computer readable medium is provided. The non-transitory computer readable medium is programmed to instruct a computer to obtain a first image and a second image of an object of interest, generate a joint histogram using the first and second images, transform the information in the histogram from histogram space to image space using a look-up table, and generate a color image using the information output from the look-up table.

DETAILED DESCRIPTION OF THE INVENTION

Figure 1:
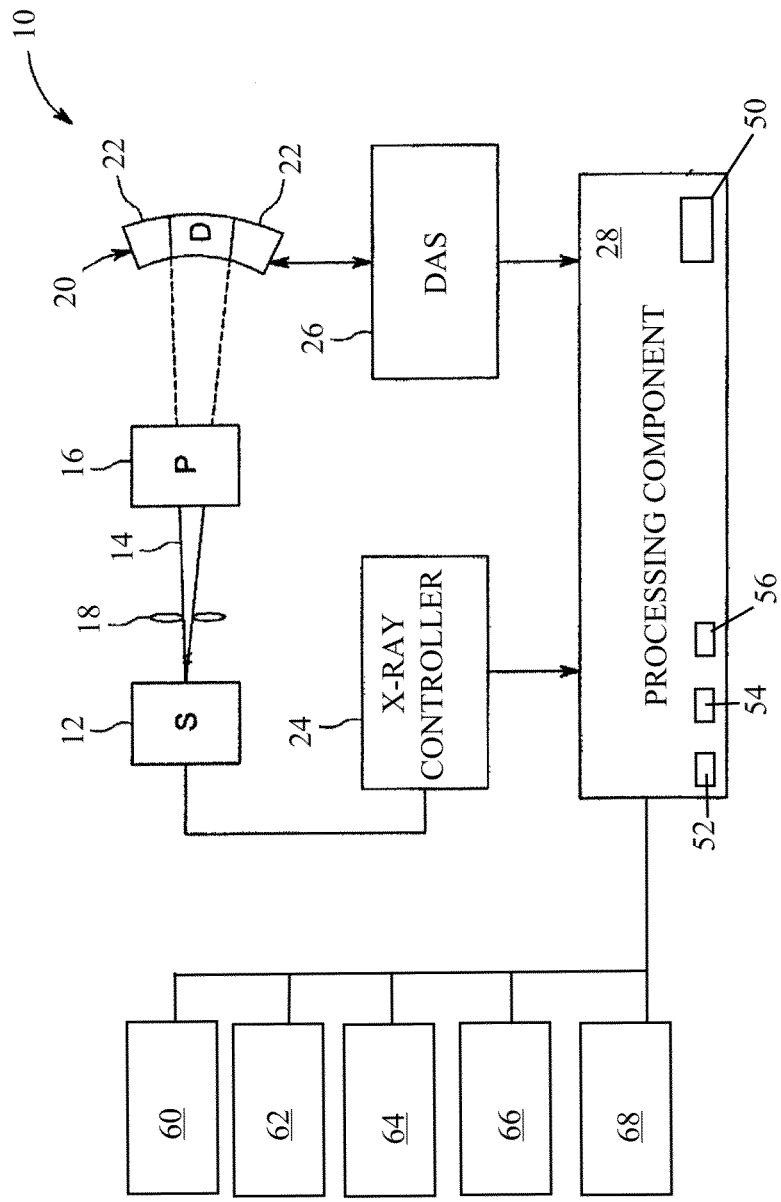
FIG. 1 is a simplified block diagram of a computed tomography (CT) imaging system that is formed in accordance with various embodiments

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although various embodiments are described with respect to a computed tomography (CT) imaging system, it should be noted that various embodiments, including methods and systems for providing joint-information based segmentation and visualization of multivariate images described herein may be used with other imaging systems. For example, the method and system may be utilized with a positron emission tomography (PET) system, a single photon emission computed tomography (SPECT) system, a magnetic resonance imaging (MR) system, an ultrasound imaging system, and/or an x-ray system, among others.

In various embodiments, a method and/or system is provided that may be utilized to generate a fusion image. As used herein, in various embodiments a fusion image is a single image that is generated using information acquired from two or more different imaging modalities or a single imaging modality operated to perform different scanning protocols. In some embodiments, the fusion image provides improved visual enhancement of differences between the images utilized to form the fusion image, such as abnormal regions, lesions, and/or contours of various organs or tumors. Accordingly, the fusion image facilitates improving a physician's diagnosis and decreasing a time by the physician to form the diagnosis.

In various other embodiments, the methods and/or systems may also be utilized to improve image segmentation. Segmentation is performed using an algorithm that receives two images as an input. The algorithm then utilizes the two images to identify contours of an organ, lesions, etc. Accordingly, in various embodiments, an image acquired from a first imaging modality and an image acquired from a second different imaging modality may be utilized to generate a fusion image. A technical effect of various embodiments is to automatically generate a fusion image which may then be utilized to facilitate improving an accuracy and a robustness of the segmentation process. For example, anatomical images may be fused with functional images to facilitate improving tumor detection and segmentation.

FIG. 1 is a simplified block diagram of an imaging system 10 that is formed in accordance with various embodiments. Although the illustrated embodiment is described with respect to a CT imaging system 10, it should be realized that the methods described herein may be utilized with any imaging system.

In the illustrated embodiment, the imaging system 10 includes an x-ray source 12 that is configured to emit radiation, e.g., x-rays 14, through a volume containing a subject 16, e.g. a patient being imaged. In the embodiment shown in FIG. 1, the imaging system 10 also includes an adjustable collimator 18. In operation, the emitted x-rays 14 pass through an opening of the adjustable collimator 18 which limits the angular range associated with the x-rays 14 passing through the volume in one or more dimensions. More specifically, the collimator 18 shapes the emitted x-rays 14, such as to a generally cone or generally fan shaped beam that passes into and through the imaging volume in which the subject 16 is positioned. The collimator 18 may be adjusted to accommodate different scan modes, such as to provide a narrow fan-shaped x-ray beam in a helical scan mode and a wider cone-shaped x-ray beam in an axial scan mode. The collimator 18 may be formed, in one embodiment, from two cylindrical disks that rotate to adjust the shape or angular range of the x-rays 14 that pass through the imaging volume. Optionally, the collimator 18 may be formed using two or more translating plates or shutters. In various embodiments, the collimator 18 may be formed such that an aperture defined by the collimator 18 corresponds to a shape of a radiation detector 20.

In operation, the x-rays 14 pass through or around the subject 16 and impinge on the detector 20. The detector 20 includes a plurality of detector elements 22 that may be arranged in a single row or a plurality of rows to form an array of detector elements 22. The detector elements 22 generate electrical signals that represent the intensity of the incident x-rays 14. The electrical signals are acquired and processed to reconstruct images of one or more features or structures within the subject 16. In various embodiments, the imaging system 10 may also include an anti-scatter grid (not shown) to absorb or otherwise prevent x-ray photons that have been deflected or scattered in the imaging volume from impinging on the detector 20. The anti-scatter grid may be a one-dimensional or two-dimensional grid and/or may include multiple sections, some of which are one-dimensional and some of which are two-dimensional.

The imaging system 10 also includes an x-ray controller 24 that is configured to provide power and timing signals to the x-ray source 12. The imaging system 10 further includes a data acquisition system 26. In operation, the data acquisition system 26 receives data collected by readout electronics of the detector 20. The data acquisition system 26 may receive sampled analog signals from the detector 20 and convert the data to digital signals for subsequent processing by a processor 28. Optionally, the digital-to-analog conversion may be performed by circuitry provided on the detector 20.

The processor 28 is programmed to perform functions described herein, and as used herein, the term processor is not limited to just integrated circuits referred to in the art as computers, but broadly refers to computers, microcontrollers, microcomputers, programmable logic controllers, application specific integrated circuits, and other programmable circuits, and these terms are used interchangeably herein. The processor 28 may be embodied as any suitably appropriate computing device, e.g., a computer, personal digital assistant (PDA), laptop computer, notebook computer, a hard-drive based device, smartphone, or any device that can receive, send, and store data.

The imaging system 10 also includes a fusion image generating module 50 that is configured to receive an image or a series of images, such as a series of images 52, and implement or perform various methods described herein. In various embodiments, the series of images 52 include images acquired from two different imaging modalities. For example, the series of images 52 may include a CT image and an MR image. The series of images 52 may include a CT image and a PET image. The series of images 52 may further include a PET image and an ultrasound image, etc. It should therefore be realized that the series of images 52 may include images acquired from a combination of any two imaging modalities described herein. Accordingly, the series of images 52 may include images acquired from the CT imaging system 10, a PET system 60, an ultrasound system 62, an x-ray system 64, a MR system 66, a SPECT system 68, and/or other imaging systems, or a combination thereof.

The fusion image generating module 50 may be implemented as a piece of hardware that is installed in the processor 28. Optionally, the fusion image generating module 50 may be implemented as a set of instructions that are installed on the processor 28. The set of instructions may be stand alone programs, may be incorporated as subroutines in an operating system installed on the processor 28, may be functions that are installed in a software package on the processor 28, or may be a combination of software and hardware. It should be understood that the various embodiments are not limited to the arrangements and instrumentality shown in the drawings.

Figure 2:
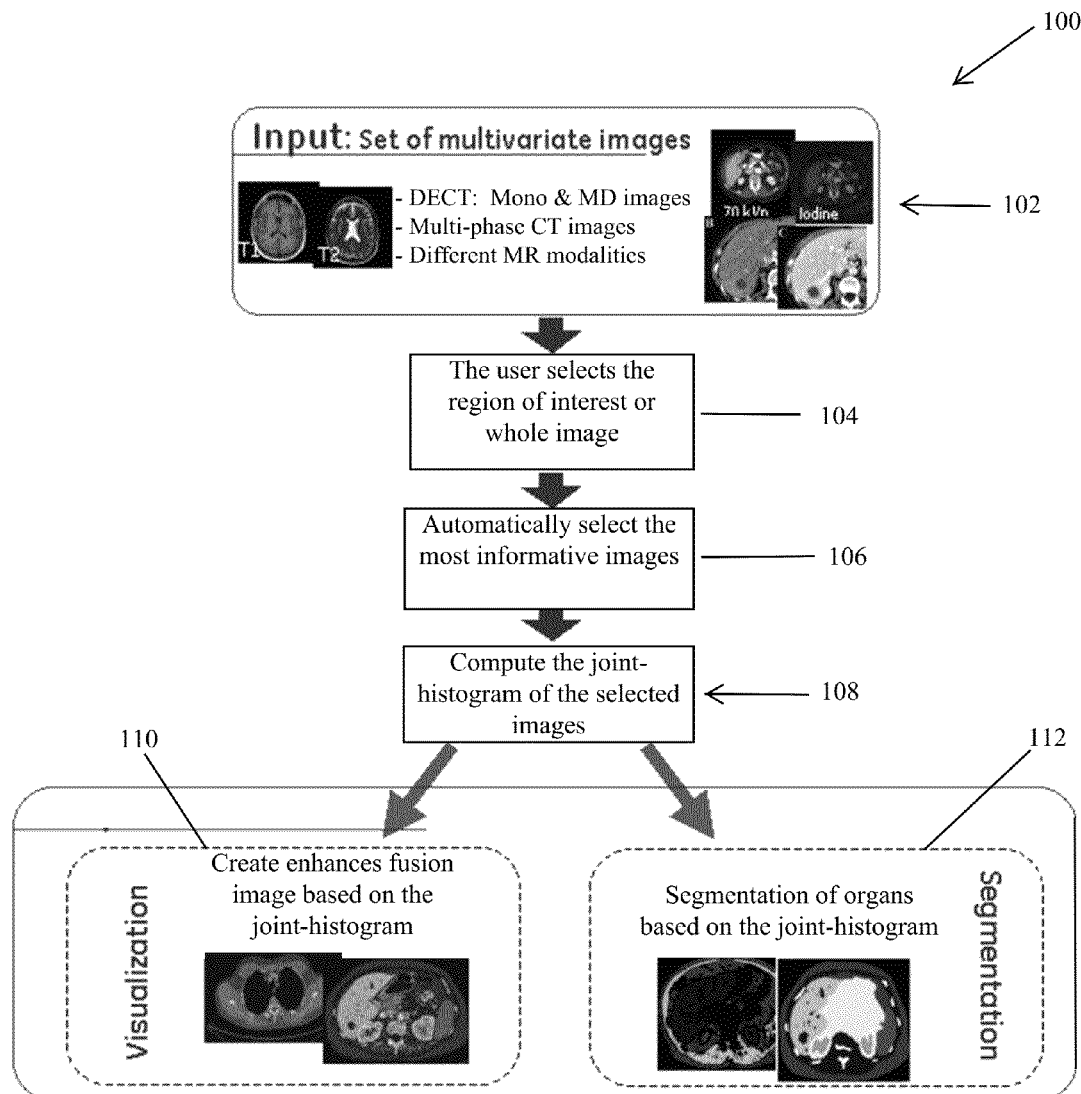
FIG. 2 is a flowchart of a method for automatically generating a fusion image in accordance with various embodiments.

FIG. 2 is a flowchart of a method 100 for automatically generating a fusion image in accordance with various embodiments. The method 100 may be implemented as a set of instructions on the fusion image generating module 50 and/or the processor 28 both shown in FIG. 1. The method 100 may be provided as a non-transitory machine-readable medium or media having instructions recorded thereon for directing the processor 28 or the image type recognition module 50 to perform one or more embodiments of the methods described herein. The medium or media may be, for example, any type of CD-ROM, DVD, floppy disk, hard disk, optical disk, flash RAM drive, or other type of computer-readable medium or a combination thereof.

In operation, the method 100 automatically generates a fusion image, such as a fusion image 54 shown in FIG. 1. Referring again to FIG. 2, at 102, a series of images, such as the images 52 shown in FIG. 1, are input to the fusion image generating module 50. As described above, the series of images 52 may include images acquired from two different imaging modalities. Accordingly, in various embodiments, the series of images 52 may include a dual-energy CT (DECT) image, a CT image, a PET image, a SPECT image, an ultrasound image, a multi-phase CT image, and/or a MR image, or a combination thereof. Therefore, a portion of the series of images 52 may be acquired using for example, the PET system 60, the ultrasound system 62, the x-ray system 64, the MR system 66, the SPECT system 68, and/or other imaging systems.

In various other embodiments, the series of images 52 may include images acquired using the same imaging modality operating using different scanning protocols. For example, the series of images 52 may include MR images acquired using different scan protocols. The series of images 52 may include DECT images, wherein each of the images is acquired at a different keV level, etc.

The series of images 52 may also include images acquired using a contrast agent, wherein each image is acquired at a different contrast phase. For example, in various embodiments, a contrast agent may be injected into a patient. The patient may then be subsequently scanned to generate the series of images 52. In various other embodiments, the patient is not injected with the contrast agent prior to scanning the patient to generate the series of images 52. It should therefore be realized that in various embodiments, administering a contrast agent to the subject is optional.

The series of images 52 may also be obtained from data collected during a previous scan of the subject, wherein the series of images 52 have been stored in a memory. Optionally, the series of images 52 may be obtained during real-time scanning of the subject. For example, the methods described herein may be performed on images as the images are received from the imaging system 10 during a real-time examination of the subject. Accordingly, in various embodiments, the user may select the series of images desired for subsequent processing. For example, the user may select the series of images 52 for subsequent processing or the user may select any other series of images for processing.

Figure 3:
FIG. 3 is an image that may be generated in accordance with various embodiments.

At 104, a region of interest is selected using the series of images 52. For example, FIG. 3 is an image 200 that may form a portion of the series of images 52. Accordingly, at 104 the user may manually select a region of interest 250 on the image 200. The region of interest 250 may represent any region that the user desires to segment or visualize. In the illustrated embodiment, the image 200 is a water image. In various other embodiments, at 102 the entire image may be selected as the region of interest.

Figure 4:
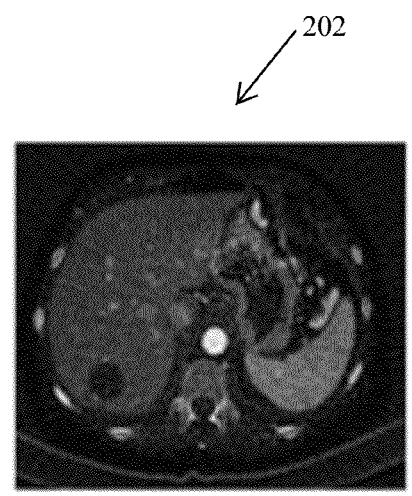
FIG. 4 is an image that may be automatically selected in accordance with various embodiments.

At 106, the fusion image generating module 50 is configured to automatically select at least one informative image from the series of images 52. For example, FIG. 4 is an image 202 that may be automatically selected at 106. In the illustrated embodiment, the image 202 is an iodine image also acquired using the CT imaging system 10. The informative image 202 may be automatically selected using information within the images themselves. More specifically, the information within the region of interest 250 may be utilized to calculate entropy of the image or other values, such as for example, noise, edges, or homogeneous regions. The remaining images within the series of images 152 may then be analyzed to find similar values to the values calculated in the region of interest 250. As a result, the fusion image generating module 50 is configured to identify at least one image, such as for example, the image 202 that has similar values to the region of interest 250 selected on the image 200.

Figure 5:
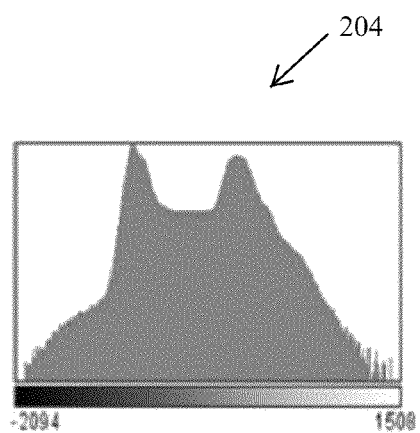
FIG. 5 is a histogram that may be generated in accordance with various embodiments.
Figure 6:
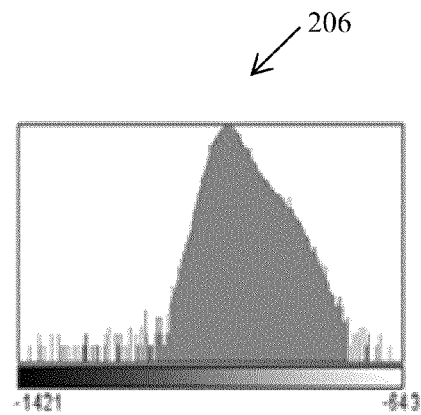
FIG. 6 is another histogram that may be generated in accordance with various embodiments.

Referring again to FIG. 2, at 108 a joint histogram is generated using the image 200 and the informative image 202 selected at 106. In operation, to generate the joint histogram, a histogram of the image 200 is generated and a histogram of the image 202 is generated. FIG. 5 is an image of a histogram 204 that may be generated using the image 200. Moreover, FIG. 6 is an image of a histogram 206 that may be generated using the image 202.

Figure 7:
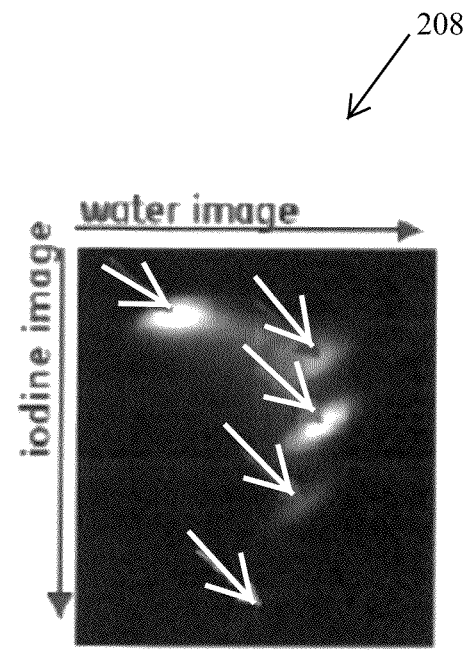
FIG. 7 is a joint histogram that may be generated using the histograms shown in FIGS. 5 and 6 in accordance with various embodiments.

Referring again to FIG. 2, the images 200 and 202 are then utilized to generate a joint histogram 208 as shown in FIG. 7. More specifically, the joint histogram 208 represents the histogrammed information generated using the images 200 and 202. Thus, in the illustrated embodiment, the joint histogram 208 includes water information acquired from the image 200 and iodine information acquired from the image 202. It should be realized that although the exemplary embodiment is described as generating a joint histogram generated from two images. The joint histogram 208 may be generated using more than two images. For example, the joint histogram 208 may be generated using three images, etc.

Referring again to FIG. 2, at 110 the joint histogram 208 is utilized to generate a fusion image. As described above, a fusion image is a single image that is generated using information acquired from two or more different imaging modalities or a single modality operated to perform different scanning protocols such as the images 200 and 202 described above.

Figure 8:
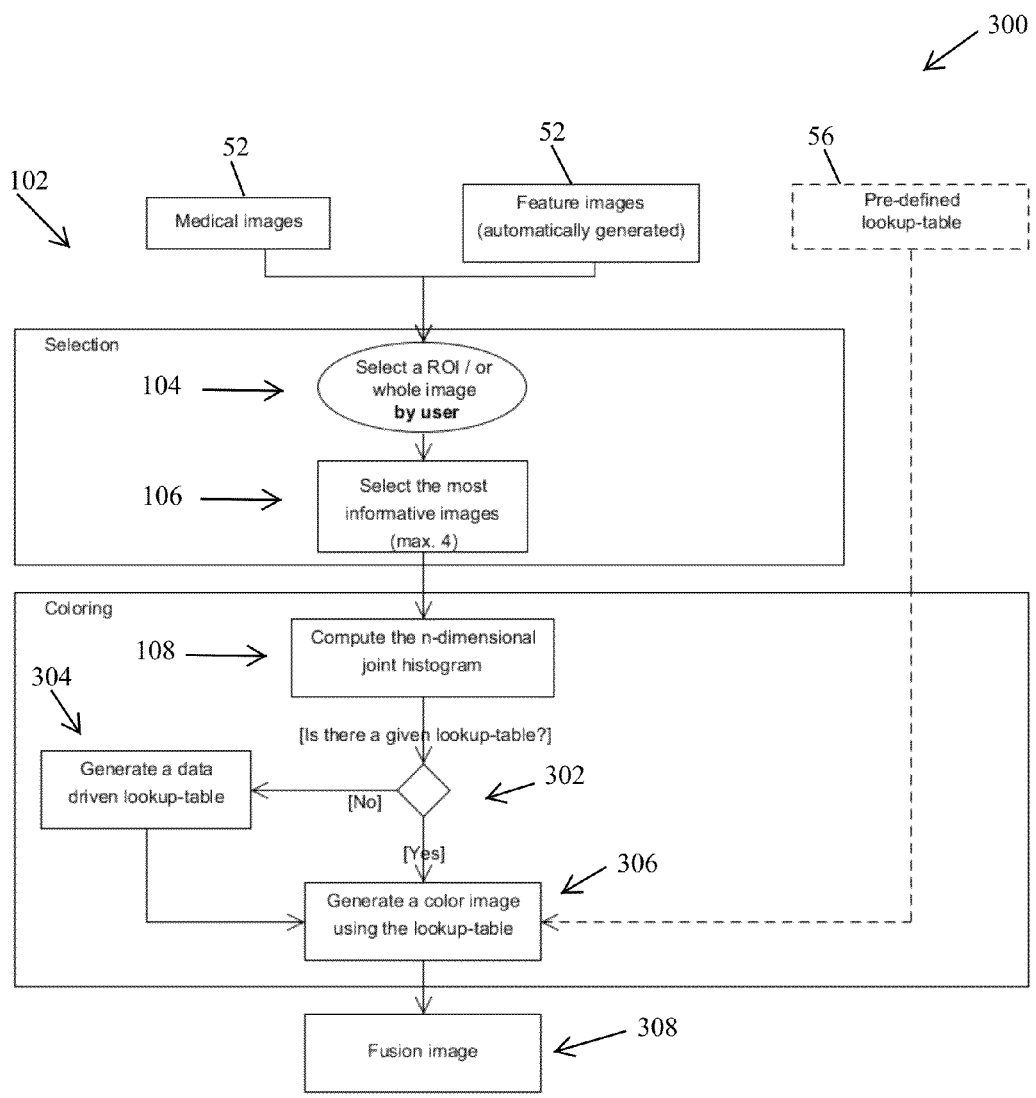
FIG. 8 is a flowchart of a method for visualizing an image in accordance with various embodiments.

FIG. 8 is a flowchart of a method 300 for generating an enhanced fusion image shown at 110 in FIG. 2. As described above, to generate a fusion image, at 102, a series of images, such as the images 52 shown in FIG. 1, are input to the fusion image generating module 50. The images may be physiological images such as medical images and/or feature images, i.e. images that show bone, etc. At 104, a region of interest is selected using the series of images 52. At 106, the fusion image generating module 50 is configured to automatically select at least one informative image from the series of images 52. Additionally, at 108 a joint histogram, such as the joint histogram 208 shown in FIG. 7, is utilized to generate a fusion image.

Referring to FIG. 8, at 302 the fusion image generating module 50 is configured to automatically locate a look-up table (LUT). As used herein, a LUT is a multi-dimensional array or matrix in which each value may be located using two or more indexing variables. In various embodiments, the indexing variables are derived from the information in the joint histogram. In various embodiments, the fusion image generating module 50 may identify a pre-defined LUT, such as the LUT 56 shown in FIG. 1. In operation, information related to each pixel in the joint histogram 208 may be input to the LUT 56. For example, the fusion image generating module 50 may be configured to determine a mean value and/or a variance value for various organs, tissues, bones, etc. using the histogram 208. Based on, for example, the mean and variance values, the fusion image generating module 50 may calculate a window level setting. The window level setting may then be input to the LUT 56 which then outputs a color for each voxel in the histogram 208. In various other embodiments, the fusion image generating module 50 may not identify a pre-defined LUT. In this case, the fusion image generating module 50 may be configured to generate a LUT based on the information in the joint histogram 208 and assign a different color for every peak in the joint histogram 208.

Figure 9:
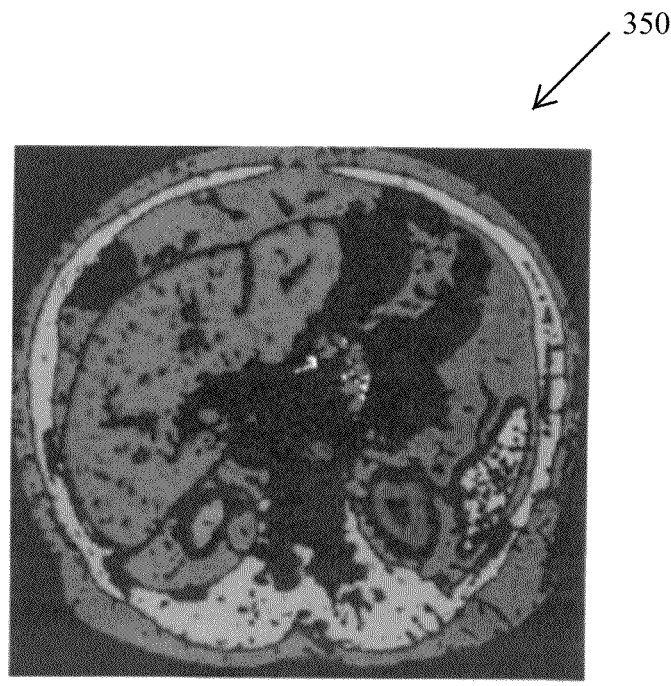
FIG. 9 is a color image that may be generated in accordance with various embodiments.

Accordingly, the LUT 56 is configured to assign a value to each pixel in the images 50 and 52 that is based on the data acquired from the LUT 56. The values output from the LUT 56 may then be utilized to generate a color image, such as the color image 350 shown in FIG. 9. More specifically, the outputs from the LUT 56 may be utilized to generate revised pixel values for the images 50 and 52. For example, the LUT 56 may assign a color to intensity pairs such that each set of intensity pairs in the images 50 and 52 is assigned the same color. The revised images, after being modified by the LUT 56, may then be fused together to form the image 350 also known herein as the fusion image 350. Referring again to FIG. 8, at 308, the fusion image generating module 50 is configured to display the fusion image 350. Accordingly, in operation using different pre-defined and/or application specific LUT's facilitates enhancing a difference between various organs, tissue, and/or structures in the image. Moreover, in various embodiments, assuming that three images are being fused, the LUT 56 may assign colors to three intensity pairs, etc.

Figure 10:
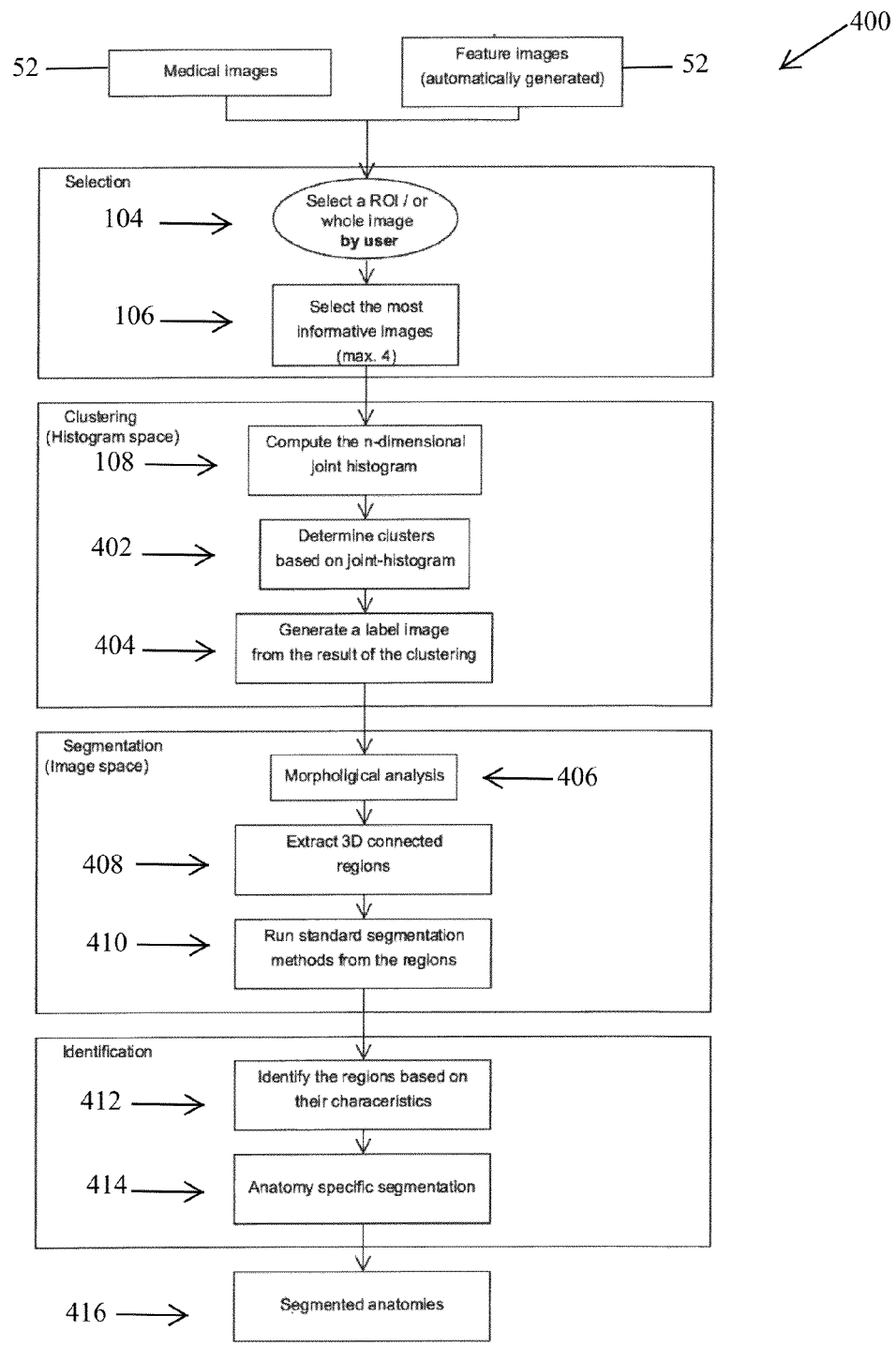
FIG. 10 is a flowchart of a method for segmenting a multivariate image that includes a plurality of images in accordance with various embodiments.
Figures 11, 12:
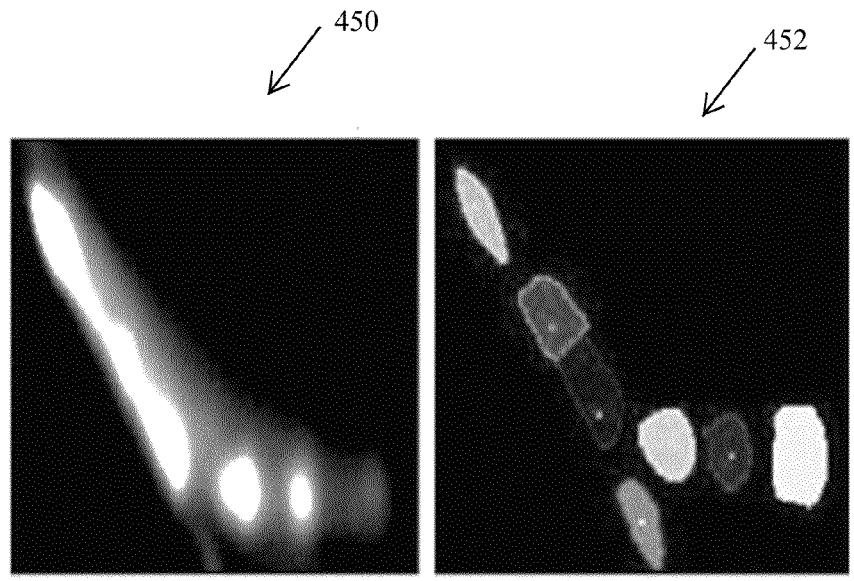
FIG. 11 is a joint histogram that may be generated in accordance with various embodiments.
FIG. 12 is the same histogram as shown in FIG. 11, where a different color is assigned for every peak that may be generated in accordance with various embodiments.

Referring again to FIG. 2, at 112 a joint histogram is utilized to perform image segmentation. FIG. 10 is a flowchart illustrating a method 400 for segmenting an enhanced fusion image shown at 112 in FIG. 2. As described above, to generate a fusion image, at 102, a series of images, such as the images 52 shown in FIG. 1, are input to the fusion image generating module 50. Additionally, the images may be physiological images such as medical images and/or feature images, i.e. images that show bone, etc. At 104, a region of interest is selected using the series of images 52. At 106, the fusion image generating module 50 is configured to automatically select at least one informative image from the series of images 52. Additionally, at 108 a joint histogram, such as a joint histogram 450 shown in FIG. 11, is generated using the images selected at 106.

In operation, the method 400 is operable to utilize information in one or more images, e.g. the images 50 and 52 for example, to improve the segmentation process. In operation, the method 400 works in both histogram space and image space. For example, a clustering of the voxels is first calculated in the histogram space. The clusters are then morphologically refined in the image space. Subsequently, anatomical structures may be identified and a segmentation performed on the anatomical structures in the image space for each anatomical structure.

At 402, clusters are determined using the joint histogram 208. The clusters may be identified using various clustering methods. For example, in various embodiments, a K-Means Clustering may be utilized. K-means clustering is an iterative technique that is used to partition an image into K clusters. The algorithm may include the following: (1) Pick K cluster centers, either randomly or based on some heuristic; (2) Assign each pixel in the image to the cluster that minimizes the variance between the pixel and the cluster center; (3) Re-compute the cluster centers by averaging all of the pixels in the cluster; (4) Iterate (2) and (3) until convergence is attained (e.g., no pixels change clusters). In this case, variance is the squared or absolute difference between a pixel and a cluster center. The difference is typically based on pixel color, intensity, texture, and location, or a weighted combination of these factors. K may be selected manually, randomly, or by a heuristic.

In the exemplary embodiment described herein, a histogram-based clustering method is utilized. In operation, a histogram, such as the histogram 450, is computed from all of the pixels in the image. The peaks and valleys in the histogram 450 are then used to locate the clusters in the image. Color or intensity may be used as the measure. FIG. 12 illustrates an exemplary image 452 illustrating the results of the clustering performed at 402.

Figure 13:
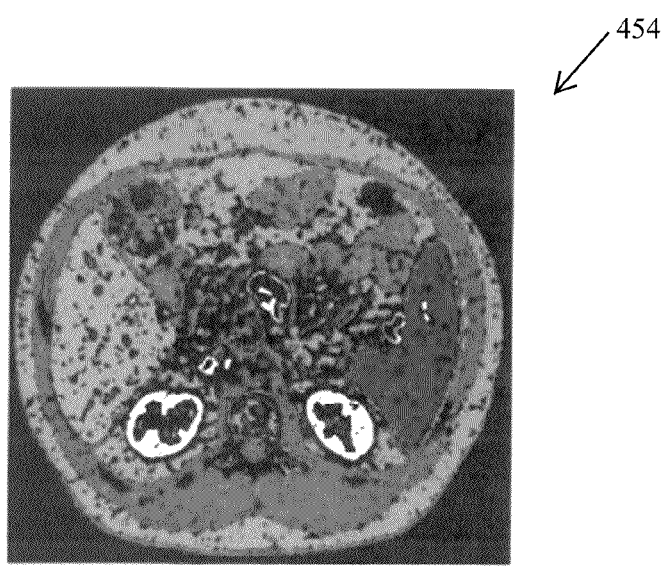
FIG. 13 is a label image that may be generated based on the colored histogram of FIG. 12 (i.e. clustering in joint histogram space) in accordance with various embodiments.

Referring again to FIG. 10, at 404 a label image is generated based on the clusters identified at 402. For example, FIG. 13 illustrates an exemplary label image 454 that may be generated at 404. In various embodiments, the pixels or voxels in the images may be labeled as a member of a tissue, a fat, a water, an iodine, a bone, etc. by assigning each of the various clusters a different color. Optionally, the clusters in the label image may be assigned different shades or patterns to enable the label image to be generated as a black and white or gray scale image. The label image 454 is then segmented in image space. More specifically, at 406 the segmentation process may include performing a morphological filtering of the label image 454. Morphological filtering may be implemented to eliminate organs, vessels, etc. that are smaller than a predetermined size. Morphological filtering may also be implemented to perform cavity filling, cavity opening, cavity closing, etc.

At 408, 3D connected regions are identified. As used herein, connected regions are regions or voxels that have a similar intensity value. For example, voxels identified as water have a similar intensity value and are therefore determined to be connected regions. At 410, the connected regions are segmented. In various embodiments, the regions may be segmented using, for example various conventional algorithms.

At 412, the regions segmented at 410 are identified based on the specific characteristics of each region. The various characteristics may include, for example, pixel intensity, pixel position, a position of the organ, a position of an organ with respect to surrounding structures, etc. In various embodiments, the regions may be identified using an artificial intelligence based algorithm. More specifically, the artificial intelligence based algorithm is configured to utilize the various imaging statistics, values, etc. to identify the various regions. In various embodiments, the algorithm may be trained using a large set of known images to generate a training dataset. The training dataset may then be utilized to train the algorithm to identify various characteristics that enable the algorithm to determine the different regions. Accordingly, in operation, the training dataset may include information of the shape of exemplary organs, expected outlines of various organs, expected pixel intensity values, etc. The known values in the training dataset may then be compared to the values in the images to segment each connected region.

Referring again to FIG. 10, at 414 an anatomy specific segmentation is performed. For example, in various embodiments, the fusion generating module 50 may automatically select a liver segmentation algorithm to segment a liver, a spleen segmentation to segment the spleen, a heart segmentation, a kidney segmentation, etc. Accordingly, at 414, a specific segmentation algorithm is utilized to segment a respective connected region. It should be realized the segmentation procedure is specifically selected based on the organ, structure, etc. and the presence or absence of a contrast agent. Moreover, it should be realized that while various embodiments describe a segmentation procedure, any image processing procedure may be automatically performed and the segmentation procedure described herein is exemplary only.

Figure 14:
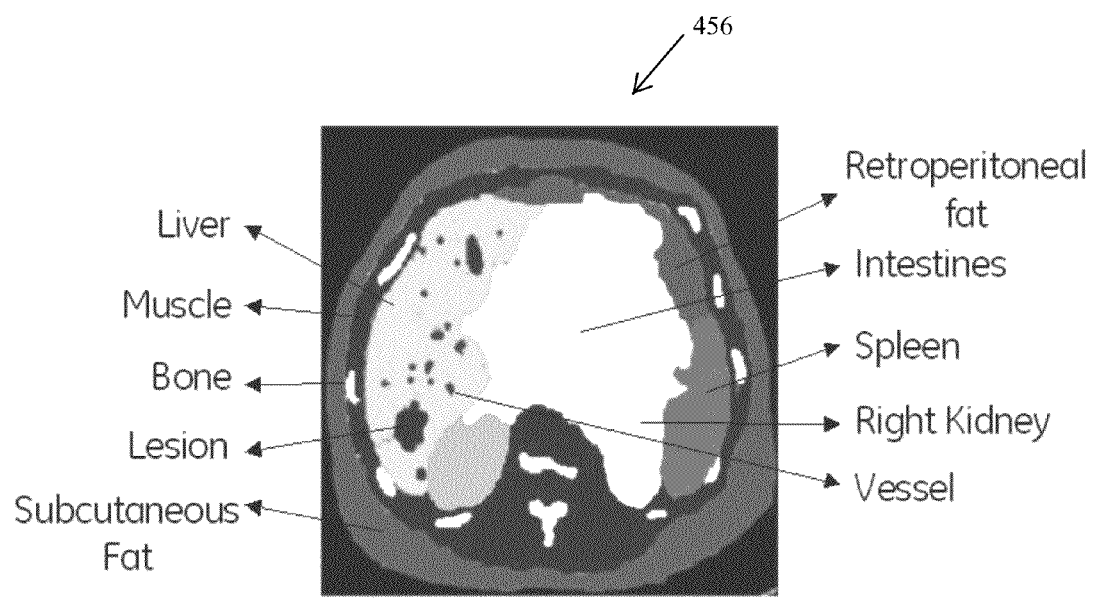
FIG. 14 is a label image that may be generated based on the label image of FIG. 13 incorporating spatial connectivity of voxels (i.e. clustering in image space) that may be displayed in accordance with various embodiments.

At 416, the segmented image generated at 414 is displayed to the user. For example, FIG. 14 illustrates an exemplary image 456 that may be displayed to a user. As shown in the image 456, the various organs, tissues, and structures are each labeled using a different color to enable a user to easily distinguish the various features in the image.

Figure 15:
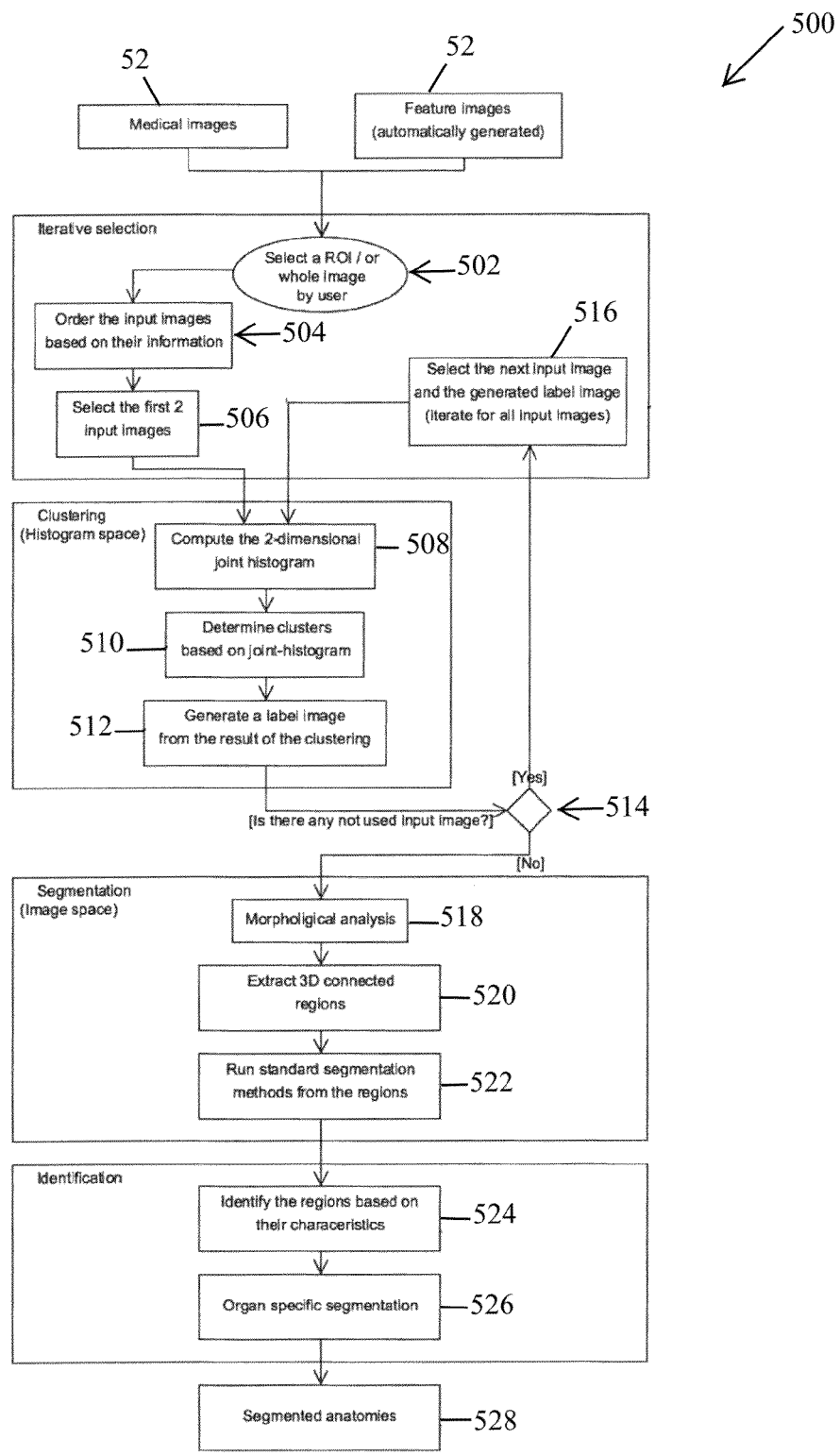
FIG. 15 is a flowchart of another method for segmenting a multivariate image that includes several images in accordance with various embodiments.

FIG. 15 is a flowchart illustrating another method 500 for segmenting an enhanced fusion image shown at 112 in FIG. 2. In various embodiments, the method 500 may be utilized to perform segmentation when the series of images 52 includes more than three images. At 502, a region of interest is selected as described above. At 504, the series of images 52 are ordered based on the information. More specifically, as described above, the information may include entropy or other values, such as for example, noise, edges, or homogeneous regions. Thus, the series of images may be ordered such that the images having a similar entropy are positioned together, images having similar edges are ordered together, etc. At 506, the first two images in the series of images are selected for subsequent processing. At 508, a joint histogram is generated using the images selected at 506. At 510, the clusters are determined using the joint histogram as described above. At 512, a label image is generated using the clusters determined at 510.

At 514, the fusion image generating module 50 is configured to determine if any of the images in the series of images 52 has not been selected for subsequent processing. For example, assume that the series of images 52 includes four images. Moreover, assume that at 506 the first two images in the series of images 52 were selected for subsequent processing. In the exemplary embodiment, the series of images 52 includes two images that have not been processed. Accordingly, at 514, if the fusion image generating module 50 determines that each of the images in the series of images 52 has been processed, the method 500 proceeds to step 516 wherein the next image in the series of images 52 is selected. Additionally, the label image generated during the previous iteration is selected. The method 500 then proceeds to step 508 wherein a joint histogram is generated using the third image and the label image from the previous iteration. The steps 514 and 516 are iterated until each of the images in the series of images 52 has been processed to generate a joint histogram.

At 518, a morphological filtering is performed as described above in method 400. At 520, 3D connected regions are identified. At 522, the connected regions are segmented. At 524, the regions segmented at 522 are identified based on the specific characteristics of each region. At 526, an anatomy specific segmentation is performed. At 528, the segmented image generated at 526 is displayed to the user.

Described herein are embodiments that are configured to generate a fusion image which improves a visualization of the joint-information of all images. The improved visualization enhances hard-to-detect differences and abnormal regions, improves the diagnostic process and is less time consuming. The fusion image also improves a user's ability to detect lesions and contour the borders of the organs or tumors. More specifically, the various embodiments described herein use multiple images, e.g. CT, MR, and other images which are fused together to improve the accuracy and robustness of the segmentation procedure. The various embodiments also enable anatomical images to be fused with functional images to improve tumor detection and segmentation. Thus, using the various embodiments described herein, the differences between organs, lesions and tissues on the images may be enhanced in both 2D and 3D visualization, and segmentation may be improved. Various methods described herein may be applied to any imaging modality and any region of the body.

Figure 16:
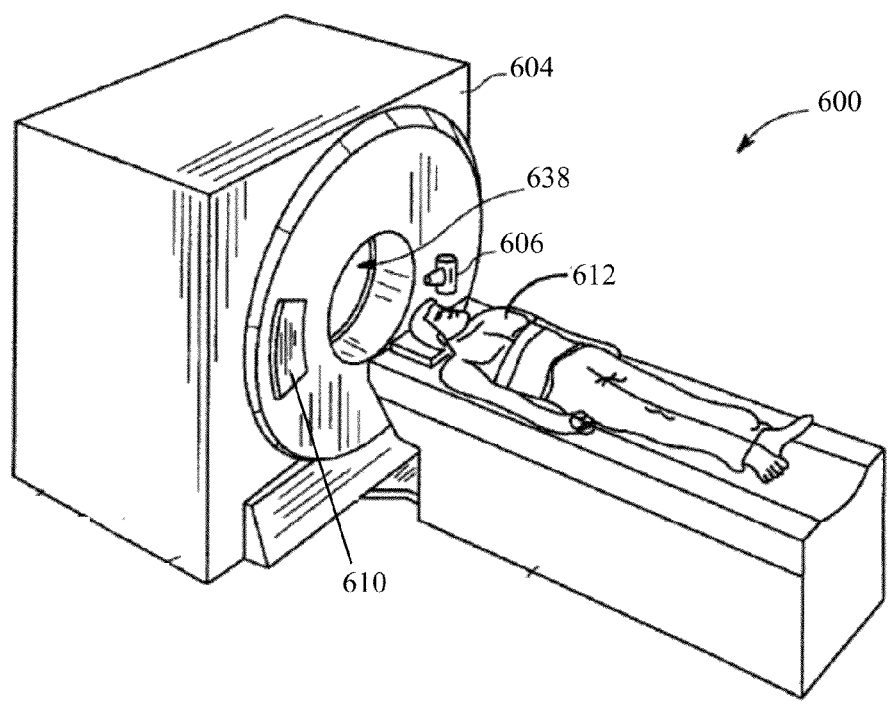
FIG. 16 is a pictorial drawing of a computed tomography (CT) imaging system constructed in accordance with various embodiments.
Figure 17:
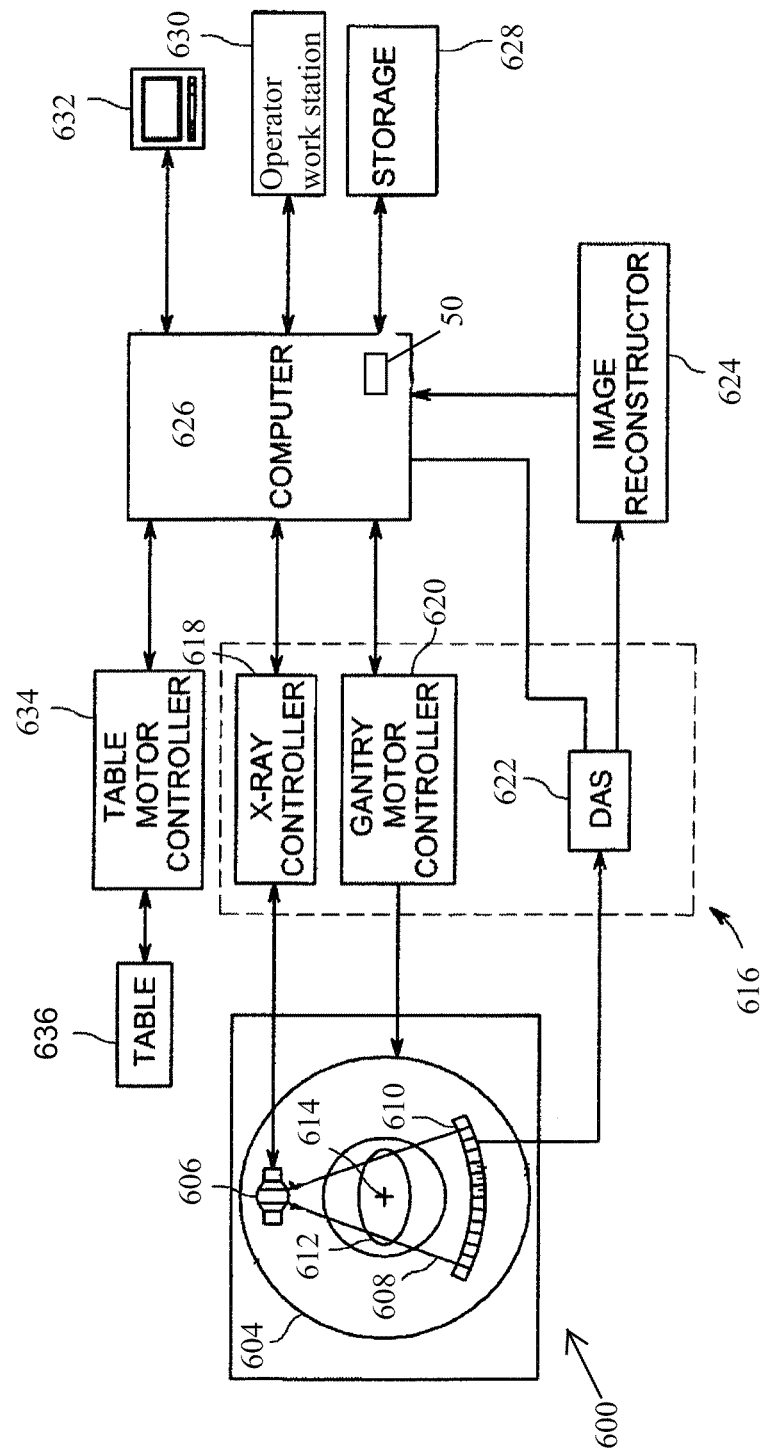
FIG. 17 is a schematic block diagram of the CT imaging system of FIG. 16.

The various methods and the fusion image generating module 50 may be implemented in an exemplary imaging system. For example, FIG. 16 is a pictorial view of an imaging system that is formed in accordance with various embodiments. FIG. 17 is a block schematic diagram of a portion of the imaging system shown in FIG. 16. Although various embodiments are described in the context of a CT imaging system, it should be understood that other imaging systems capable of performing the functions described herein are contemplated as being used.

Referring to FIGS. 16 and 17, the CT imaging system 600 includes a gantry 604, which includes an x-ray source 606 that projects a beam of x-rays 608 toward a detector array 610 on the opposite side of the gantry 604. The detector array 610 is formed by a plurality of detector rows (not shown) including a plurality of the detectors 602 that together sense the projected x-rays that pass through an object, such as a patient 612 that is disposed between the detector array 610 and the x-ray source 606. Each detector 602 produces an electrical signal that represents the intensity of an impinging x-ray beam and hence can be used to estimate the attenuation of the beam as the beam passes through the patient 612. During a scan to acquire x-ray projection data, the gantry 604 and the components mounted therein rotate about a center of rotation 614. FIG. 17 shows only a single row of detectors 602 (i.e., a detector row). However, the multi-slice detector array 610 includes a plurality of parallel detector rows of detectors 602 such that projection data corresponding to a plurality of quasi-parallel or parallel slices can be acquired simultaneously during a scan.

Rotation of components on the gantry 604 and the operation of the x-ray source 606 are controlled by a control mechanism 616 of the CT imaging system 600. The control mechanism 616 includes an x-ray controller 618 that provides power and timing signals to the x-ray source 606 and a gantry motor controller 620 that controls the rotational speed and position of components on the gantry 604. A data acquisition system (DAS) 622 in the control mechanism 616 samples analog data from the detectors 602 and converts the data to digital signals for subsequent processing. An image reconstructor 624 receives sampled and digitized x-ray data from the DAS 622 and performs high-speed image reconstruction. The reconstructed images, i.e. the series of images 52, are applied as an input to a computer 626 that stores the image in a storage device 628. The image reconstructor 624 can be specialized hardware or computer programs executing on the computer 626. In various embodiments, the computer 626 may include the fusion image generating module 50 described above.

The computer 626 also receives commands and scanning parameters from an operator via an operator workstation 630 that has a keyboard and/or other user input and/or marking devices, such as a mouse, trackball, or light pen. An associated display 632, examples of which include a cathode ray tube (CRT) display, liquid crystal display (LCD), or plasma display, allows the operator to observe the reconstructed image and other data from the computer 626. The display 632 may include a user pointing device, such as a pressure-sensitive input screen. The operator supplied commands and parameters are used by the computer 626 to provide control signals and information to the DAS 622, the x-ray controller 618, and the gantry motor controller 620. In addition, the computer 626 operates a table motor controller 634 that controls a motorized table 636 to position the patient 612 in the gantry 604. For example, the table 636 moves portions of the patient 612 through a gantry opening 638.

Various embodiments described herein provide a tangible and non-transitory machine-readable medium or media having instructions recorded thereon for a processor or computer to operate an imaging apparatus to perform one or more embodiments of methods described herein. The medium or media may be any type of CD-ROM, DVD, floppy disk, hard disk, optical disk, flash RAM drive, or other type of computer-readable medium or a combination thereof.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the described subject matter without departing from their scope. While the dimensions and types of materials described herein are intended to define the parameters of the various embodiments of the invention, the embodiments are by no means limiting and are exemplary embodiments. Many other embodiments will be apparent to one of ordinary skill in the art upon reviewing the above description. The scope of the various embodiments of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable one of ordinary skill in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for generating an image, said method comprising:
    obtaining a first image and a second image of an object of interest;
    generating a joint histogram using the first and second images;

transforming the information in the histogram from histogram space to image space using a look-up table;
generating a color image using the information output from the look-up table; and
generating a label image and segmenting the label image.

2. The method of claim 1, wherein the second image is an informative image.

3. The method of claim 1, further comprising:
determining clusters using the joint histogram; and
segmenting the clusters to generate the color image.

4. The method of claim 3, further comprising:
generating the label image using the determined clusters; and
segmenting the clusters using the label image.

5. The method of claim 4, further comprising:
performing a morphological analysis of the label image;
extracting connected regions using based on the morphological analysis; and
segmenting the label image to generate the color image.

6. The method of claim 5, further comprising:
identifying the connected regions based on characteristics of the connected regions;
selecting a segmentation algorithm based on the identified connected regions; and
performing the segmentation on each of the identified connected regions using the selected segmentation algorithm.

7. The method of claim 1, further comprising:
generating the label image using the joint histogram;
obtaining a third image; and
generating a second joint histogram using the label image and the third image.

8. The method of claim 1, wherein the first image is acquired using a first imaging modality and the second image is acquired using a second imaging modality.

9. The method of claim 1, wherein the first image is acquired using a first imaging modality and a first scanning protocol and the second image is acquired using the first imaging system and a second scanning protocol.

10. An imaging system comprising:
an imaging scanner; and
a processor coupled to the imaging scanner, the processor configured to:
obtain a first image and a second image of an object of interest;
generate a joint histogram using the first and second images;
transform the information in the histogram from histogram space to image space using a look-up table;
generate a color image using the information output from the look-up table; and
generate a label image and segment the label image.

11. The imaging system of claim 10, wherein the second image is an informative image.

12. The imaging system of claim 10, wherein the processor is further configured to:
determine clusters using the joint histogram; and
segment the clusters to generate the color image.

13. The imaging system of claim 12, wherein the processor is further configured to:
generate the label image using the determined clusters; and
segment the clusters using the label image.

14. The imaging system of claim 13, wherein the processor is further configured to:
perform a morphological analysis of the label image;
extract connected regions using based on the morphological analysis; and
segment the label image to generate the color image.

15. The imaging system of claim 14, wherein the processor is further configured to:
identify the connected regions based on characteristics of the connected regions;
select a segmentation algorithm based on the identified connected regions; and
perform the segmentation on each of the identified connected regions using the selected segmentation algorithm.

16. The imaging system of claim 10, wherein the processor is further configured to:
generate the label image using the joint histogram;
obtain a third image; and
generate a second joint histogram using the label image and the third image.

17. The imaging system of claim 10, wherein the first image is acquired using a first imaging modality and the second image is acquired using a second imaging modality.

18. A non-transitory computer readable medium being programmed to instruct a computer to:
obtain a first image and a second image an of object of interest;
generate a joint histogram using the first and second images;
transform the information in the histogram from histogram space to image space using a look-up table; and
generate a color image using the information output from the look-up table; and
generate a label image and segment the label image.

19. The non-transitory computer readable medium of claim 18, further programmed to instruct the computer to:
determine clusters using the joint histogram; and
segment the clusters to generate the color image.

20. The non-transitory computer readable medium of claim 18, further programmed to instruct the computer to:
generate the label image using the determined clusters; and
segment the clusters using the label image.

* * * * *